US010719511B2

(12) United States Patent
Anderson

(10) Patent No.: US 10,719,511 B2
(45) Date of Patent: *Jul. 21, 2020

(54) PROFILING DATA WITH SOURCE TRACKING

(71) Applicant: Ab Initio Technology LLC, Lexington, MA (US)

(72) Inventor: Arlen Anderson, Kidlington (GB)

(73) Assignee: Ab Initio Technology LLC, Lexington, MA (US)

( * ) Notice: Subject to any disclaimer, the term of this patent is extended or adjusted under 35 U.S.C. 154(b) by 565 days.

This patent is subject to a terminal disclaimer.

(21) Appl. No.: 15/431,008

(22) Filed: Feb. 13, 2017

(65) Prior Publication Data

US 2017/0154075 A1    Jun. 1, 2017

Related U.S. Application Data

(63) Continuation of application No. 13/957,641, filed on Aug. 2, 2013, now Pat. No. 9,569,434.

(Continued)

(51) Int. Cl.
*G06F 16/00* (2019.01)
*G06F 16/2453* (2019.01)
(Continued)

(52) U.S. Cl.
CPC ........ *G06F 16/24544* (2019.01); *G06F 16/00* (2019.01); *G06F 16/215* (2019.01);
(Continued)

(58) Field of Classification Search
CPC ........... G06F 16/2454; G06F 16/24544; G06F 16/245; G06F 16/215; G06F 16/2228;
(Continued)

(56) References Cited

U.S. PATENT DOCUMENTS

| 5,179,643 A | 1/1993 | Homma et al. |
| 5,604,899 A | 2/1997 | Doktor |

(Continued)

FOREIGN PATENT DOCUMENTS

| CN | 1314634 | 9/2001 |
| CN | 1749224 | 3/2006 |

(Continued)

OTHER PUBLICATIONS

Brian Coxa, Thomas Kislinger and Andrew Emilia—"Integrating gene and protein expression data: pattern analysis and proWle mining"—Methods vol. 35, Issue 3, Mar. 2005, pp. 303-314—Mass Spectrometry in Proteomics.

(Continued)

*Primary Examiner* — Anh Ly
(74) *Attorney, Agent, or Firm* — Occhiuti & Rohlicek LLP

(57) ABSTRACT

Profiling data includes accessing multiple collections of records to store quantitative information for each particular collection including, for at least one selected field of the records in the particular collection, a corresponding list of value count entries, each including a value appearing in the selected field and a count of the number of records in which the value appears. Processing the quantitative information of two or more collections includes: merging the value count entries of corresponding lists for at least one field from each of a first collection and a second collection to generate a combined list of value count entries, and aggregating value count entries of the combined list of value count entries to generate a list of distinct field value entries identifying a distinct value and including information quantifying a number of records in which the distinct value appears for each of the two or more collections.

38 Claims, 6 Drawing Sheets

Related U.S. Application Data

(60) Provisional application No. 61/716,766, filed on Oct. 22, 2012.

(51) Int. Cl.
*G06F 16/215* (2019.01)
*G06F 16/245* (2019.01)
*G06F 16/25* (2019.01)
*G06F 16/22* (2019.01)
*G06F 16/23* (2019.01)

(52) U.S. Cl.
CPC ...... *G06F 16/2228* (2019.01); *G06F 16/2365* (2019.01); *G06F 16/245* (2019.01); *G06F 16/258* (2019.01)

(58) Field of Classification Search
CPC .... G06F 16/258; G06F 16/2365; G06F 16/00; G06F 17/30303; G06F 17/30371; G06F 17/30321; G06F 17/30; G06F 16/9014; G06F 16/2453; G06F 16/951; G06F 16/31; G06F 16/435; G06F 16/137; G06F 16/285; G06F 17/30949; G06F 17/30946; G06N 5/025; H04L 12/70; H04L 63/0263; H04L 63/1408; H04L 12/56; H04L 67/322; H04L 41/0869
See application file for complete search history.

(56) References Cited

U.S. PATENT DOCUMENTS

| | | |
|---|---|---|
| 5,742,806 A | 4/1998 | Reiner et al. |
| 5,842,200 A | 11/1998 | Agrawal et al. |
| 5,845,285 A | 12/1998 | Klein |
| 5,966,072 A | 10/1999 | Stanfill et al. |
| 6,134,560 A | 10/2000 | Kliebhan |
| 6,138,123 A | 10/2000 | Rathbun |
| 6,163,774 A | 12/2000 | Lore et al. |
| 6,343,294 B1 | 1/2002 | Hawley |
| 6,546,416 B1 | 4/2003 | Kirsch |
| 6,553,366 B1 | 4/2003 | Miller et al. |
| 6,601,048 B1 | 7/2003 | Gavan et al. |
| 6,657,568 B1 | 12/2003 | Coelho et al. |
| 6,741,995 B1 | 5/2004 | Chen et al. |
| 6,788,302 B1 | 9/2004 | Ditlow et al. |
| 6,801,938 B1 | 10/2004 | Bookman et al. |
| 6,839,682 B1 | 1/2005 | Blume et al. |
| 6,952,693 B2 | 10/2005 | Wolff et al. |
| 6,959,300 B1 | 10/2005 | Caldwell et al. |
| 7,013,290 B2 | 3/2006 | Ananian |
| 7,031,843 B1 | 4/2006 | Bullard et al. |
| 7,032,212 B2 | 4/2006 | Amir et al. |
| 7,043,476 B2 | 5/2006 | Robson |
| 7,047,230 B2 | 5/2006 | Gibbons |
| 7,058,819 B2 | 6/2006 | Okaue |
| 7,117,222 B2 | 10/2006 | Santosuosso |
| 7,130,760 B2 | 10/2006 | Ilic |
| 7,130,852 B2 | 10/2006 | Parent |
| 7,149,736 B2 | 12/2006 | Chkodrov et al. |
| 7,359,847 B2 | 4/2008 | Gabele et al. |
| 7,376,656 B2 | 5/2008 | Blakeley et al. |
| 7,386,318 B2 | 6/2008 | Moon et al. |
| 7,392,169 B2 | 6/2008 | Gabele et al. |
| 7,395,243 B1 | 7/2008 | Zielke et al. |
| 7,403,942 B1 | 7/2008 | Bayliss |
| 7,426,520 B2 | 9/2008 | Gorelik et al. |
| 7,433,861 B2 | 10/2008 | Santosuosso |
| 7,584,205 B2 | 9/2009 | Stanfill et al. |
| 7,587,394 B2 | 9/2009 | Chang et al. |
| 7,689,542 B2 | 3/2010 | Yoaz et al. |
| 7,694,088 B1* | 4/2010 | Bromley ............ G06F 11/1458 711/162 |
| 7,698,163 B2 | 4/2010 | Reed et al. |
| 7,698,345 B2 | 4/2010 | Samson et al. |
| 7,720,878 B2 | 5/2010 | Caldwell et al. |
| 7,756,873 B2 | 7/2010 | Gould et al. |
| 7,774,346 B2 | 8/2010 | Hu et al. |
| 7,813,937 B1 | 10/2010 | Pathria et al. |
| 7,849,075 B2 | 12/2010 | Gould et al. |
| 7,877,350 B2 | 1/2011 | Stanfill et al. |
| 7,899,833 B2 | 3/2011 | Stevens et al. |
| 7,904,464 B2 | 3/2011 | Golwalkar et al. |
| 7,912,867 B2 | 3/2011 | Suereth et al. |
| 7,958,142 B2 | 6/2011 | Li et al. |
| 7,966,305 B2 | 6/2011 | Olsen |
| 8,122,046 B2 | 2/2012 | Chang et al. |
| 8,145,642 B2 | 3/2012 | Cruanes et al. |
| 8,250,044 B2 | 8/2012 | Santosuosso |
| 8,271,452 B2 | 9/2012 | Longshaw |
| 8,296,274 B2 | 10/2012 | Leppard |
| 8,326,824 B2 | 12/2012 | Agrawal et al. |
| 8,359,296 B2 | 1/2013 | Santosuosso |
| 8,396,873 B2 | 3/2013 | Xie |
| 8,412,713 B2 | 4/2013 | Stewart et al. |
| 8,447,743 B2 | 5/2013 | Santosuosso |
| 8,463,739 B2 | 6/2013 | Williamson |
| 8,560,575 B2 | 10/2013 | Gradin et al. |
| 8,572,018 B2 | 10/2013 | Mishra et al. |
| 8,615,519 B2 | 12/2013 | Froemmgen |
| 8,666,919 B2 | 3/2014 | Miranda et al. |
| 8,762,396 B2 | 6/2014 | Hudzia et al. |
| 8,775,447 B2 | 7/2014 | Roberts |
| 8,825,695 B2 | 9/2014 | Studer et al. |
| 8,856,085 B2 | 10/2014 | Gorelik |
| 8,868,580 B2 | 10/2014 | Gould et al. |
| 8,924,402 B2 | 12/2014 | Fuh et al. |
| 9,251,212 B2 | 2/2016 | Cao et al. |
| 9,275,367 B2 | 3/2016 | Neway |
| 9,323,748 B2 | 4/2016 | Anderson |
| 9,336,246 B2 | 5/2016 | Gorelik et al. |
| 9,449,057 B2 | 9/2016 | Anderson |
| 2002/0073138 A1 | 6/2002 | Gilbert et al. |
| 2002/0120602 A1 | 8/2002 | Overbeek et al. |
| 2002/0161778 A1 | 10/2002 | Linstedt |
| 2003/0033138 A1 | 2/2003 | Bangalore et al. |
| 2003/0063779 A1* | 4/2003 | Wrigley ............... G06Q 30/02 382/116 |
| 2003/0140027 A1 | 7/2003 | Huttel et al. |
| 2004/0083199 A1 | 4/2004 | Govindugari et al. |
| 2004/0111410 A1 | 6/2004 | Burgoon et al. |
| 2004/0249810 A1 | 12/2004 | Das et al. |
| 2004/0260711 A1 | 12/2004 | Chessell et al. |
| 2005/0048564 A1 | 3/2005 | Emili et al. |
| 2005/0102297 A1* | 5/2005 | Lloyd ............. H04L 29/12132 707/E17.01 |
| 2005/0102325 A1* | 5/2005 | Gould ................. G06F 16/252 |
| 2005/0177578 A1 | 8/2005 | Chen et al. |
| 2005/0183094 A1* | 8/2005 | Hunt ..................... G06F 9/465 719/315 |
| 2005/0240354 A1 | 10/2005 | Mamou et al. |
| 2006/0064313 A1* | 3/2006 | Steinbarth ............ G06Q 10/10 705/322 |
| 2006/0069717 A1 | 3/2006 | Mamou et al. |
| 2007/0021995 A1 | 1/2007 | Toklu et al. |
| 2007/0073721 A1 | 3/2007 | Belyy et al. |
| 2007/0106666 A1* | 5/2007 | Beckerle ............... G06F 16/27 707/E17.005 |
| 2007/0214179 A1 | 9/2007 | Hoang |
| 2008/0114789 A1 | 5/2008 | Wysham |
| 2008/0140646 A1* | 6/2008 | Inoue ................ G06Q 30/0601 707/E17.017 |
| 2008/0319942 A1* | 12/2008 | Courdy ................ G06Q 10/10 707/E17.014 |
| 2009/0226916 A1 | 9/2009 | Desimas et al. |
| 2010/0114976 A1 | 5/2010 | Castellanos et al. |
| 2011/0029478 A1 | 2/2011 | Broeker |
| 2011/0137940 A1 | 6/2011 | Gradin et al. |
| 2011/0153667 A1 | 6/2011 | Parmenter et al. |
| 2012/0158745 A1 | 6/2012 | Gorelik et al. |
| 2013/0006931 A1* | 1/2013 | Nelke .................. G06Q 10/10 707/625 |

(56) References Cited

U.S. PATENT DOCUMENTS

| | | | | |
|---|---|---|---|---|
| 2013/0100957 | A1* | 4/2013 | Suzuki | H04L 67/28 |
| | | | | 370/392 |
| 2013/0247008 | A1* | 9/2013 | Mitran | G06F 9/30145 |
| | | | | 717/130 |
| 2014/0114987 | A1* | 4/2014 | Hoeng | G06N 7/005 |
| | | | | 707/748 |
| 2014/0115013 | A1 | 4/2014 | Anderson | |
| 2014/0147013 | A1 | 5/2014 | Shandas et al. | |
| 2014/0294993 | A1* | 10/2014 | Bueno | A61K 31/566 |
| | | | | 424/649 |
| 2015/0220838 | A1* | 8/2015 | Martin | G06N 5/04 |
| | | | | 706/12 |
| 2016/0232115 | A1 | 8/2016 | Sawal et al. | |
| 2017/0139996 | A1* | 5/2017 | Marquardt | G06F 16/221 |

FOREIGN PATENT DOCUMENTS

| | | |
|---|---|---|
| CN | 1853181 | 10/2006 |
| CN | 1993755 | 7/2007 |
| CN | 101271471 | 9/2008 |
| CN | 101271472 | 9/2008 |
| EP | 1136918 | 9/2001 |
| EP | 1302871 | 4/2003 |
| JP | 03-002938 | 1/1991 |
| JP | H07502617 | 3/1995 |
| JP | 08030637 | 2/1996 |
| JP | 10055367 | 2/1998 |
| JP | 10091633 | 4/1998 |
| JP | 10320423 | 12/1998 |
| JP | 200143237 | 2/2001 |
| JP | 2001142827 | 5/2001 |
| JP | 2002-024262 | 1/2002 |
| JP | 20100072823 | 4/2010 |
| JP | 2012038066 | 2/2012 |
| KR | 10-2006-0080588 | 7/2006 |
| WO | 200010103 | 2/2000 |
| WO | 2000-57312 | 9/2000 |
| WO | 2000/57312 | 9/2000 |
| WO | 00/79415 | 12/2000 |
| WO | 2000-79415 | 12/2000 |
| WO | 2003/071450 | 8/2003 |
| WO | 2005-029369 | 3/2005 |
| WO | 2005/029369 | 3/2005 |
| WO | 20090095981 | 8/2009 |

OTHER PUBLICATIONS

Trishul M. Chilimbi, Aditya V. Non and Kapil Vaswani—"Quantifying the Effectiveness of Testing via Efficient Residual Path Profiling"—Published in:Proceeding ESEC-FSE companion '07 The 6th Joint Meeting on European software engineering conference and the ACM SIGSOFT symposium on the foundations of software engineering—pp. 545-548.
Kouris et al., "Using Information Retrieval Techniques for Supporting Data Mining," Data & Knowledge Engineering 52 (2005) 353-383.
Kandel et al., "Pro filer: Integrated Statistical Analysis and Visualization for Data Quality Assessment," AVI '12 Proceedings of the International Working Conference on Advanced Visual Interfaces, May 21, 2012.
DataFlux Corporation, "Data Profiling. The Foundation for Data Management," Jul. 2004.
Bell et al., "Discovery of Data Dependencies in Relational Databases," University of Dortmund, LS-8, Report 14, Apr. 3, 1995.
Alur et al., "IBM WebSphere Information Analyzer and Data Quality Assessment," Dec. 1, 2007.
Yoon, Jong P., et al., "BitCube: A Three-Dimensional Bitmap Indexing for XML Documents," Journal of Intelligent Information Systems, 2001, 17:2/3, pp. 241-254.
Yao, Hong et al., "Mining functional dependencies from data," Sep. 15, 2007, Springer Science—Business Media, Data Mining and Knowledge Discovery, vol. 16, No. 2, pp. 197-219.
Yao, H. et al., "FD_Mine: Discovering Functional Dependencies in a Database Using Equivalencies," Proceedings of the 2nd IEEE International Conference on Data Mining, Dec. 9-12, 2002, pp. 729-732.
Yao, H. et al., "FD_Mine: Discovering Functional Dependencies in a Database Using Equivalences," University of Regina, Department of Computer Science, Technical Report TR 2002-04, Aug. 2002.
Yan, Men in, et al., "Algorithm for discovering multivalued dependencies," 2001, ACM Proceedings of the 10th International Conference on Information and Knowledge Management, pp. 556-558.
Wyss et al.. "FastFDs: A Heuristic-Driven, Depth-First Algorithm for Mining Functional Dependencies from Relation Instances." (Extended Abstract) Computer Science Department, Indiana University XP-002333906 101-110.
Summons to attend oral proceedings pursuant to Rule I15(a) EPC in EP application No. 04784113.5, dated Jul. 30, 2010,8 pages.
Rahm, et al., "Data Cleaning: Problems and Current Approaches", XP-002284896 (2000).
Petit et al.. "Towards the Reverse Engineering of Denormalizes Relational Databases." Laboratoire d'Ingenierie des Systemes d'Information, Lyon (1996),218-227.
Olson, "Know Your Data: Data Profiling Solutions for Today's Hot Projects", XP-0023 13222, p. 1-4, published in DM printed Review, from DMReview.com (Mar. 2000).
Novelli, N. et al., "FUN: An Efficient Algorithm for Mining Functional and Embedded Dependencies," Proceedings of the 8th International Conference on Database Theory (ICDT 2001), LNCS 1973,Jan. 4-6, 2001, pp. 189-203.
Notification of Reason(s) for Refusal in Japanese Patent Application No. 2006-526986, dated Oct. 13, 2010, 3 pages.
Munakata, Koichi, "Integration of Distributed Heterogeneous Information Sources," with English Translation. Systems, Control and Information, Japan, The Institute of Systems, Control and Information Engineers, Dec. 15, 1996, vol. 40, No. 12, pp. 514-521.
Milne, Robert et al., "Predicting Paper Making Defects On-line Using Data Mining," Jul. 24, 1998, Knowledge-Based Systems, vol. 11, pp. 331-338.
Mannila, Heikki, "Theoretical Frameworks for Data Mining," Jan. 2000, SIGKDD Explorations, vol. 1, No. 2, pp. 30-32.
Lopes, S. et al., "Efficient Discovery of Functional Dependencies and Armstrong Relations," Proceedings of the 7th International Conference on Extending Database Technology (EDBT 2000), LNCS 1777,Mar. 27-31, 2000, pp. 350-364.
Li et al., "A Practical External Sort for Shared Disk MPPs", http://www.thearling.com/text/sc93/sc93.
Lemire et al. "Sorting Improves Word-Aligned Bitmap Indexes" Data & Knowledge Engineering, Dec. 2009, pp. 1-43.
Lee, Kyong-Ha et al., "Bitmap Indexes for Relational XML Twig Query Processing," OIKM '09, Nov. 2-6, 2009,10 pages.
Kivinen, J and H. Mannila, "Approximate Inference of Functional Dependencies from Relations," Theoretical Computer Science, vol. 149, 1995, pp. 129-149.
Johnson, T et al., "Comparing Massive High-Dimensional Data Sets," Proceedings of the 4th DE International Conference on Knowledge Discovery and Data Mining (KDD 98), Aug. 27-31, 1998, pp. 229-233.
Jahnke et al.. "Adaptive Tool Support for Database Reverse Engineering." AG-Softwaretechnik, Universitat Paderborn, Germany (19990, 278-282.
Jaedicke, et al., On Parallel Processing of Aggregate and Scalar Functions in Object-Relational DBMS, XP-002313223, pp. 379-389 (1998)
International Search Report & Written Opinion, PCTIUS20I2/022905, dated May 2, 2012, 12 pages.
IBM "Profiling: Take the First Step Toward Assuring Data Quality," white paper, GC-18-9728-00, Dec. 2005.
Huhtala et al., "TANE: An Efficient Algorithm for Discovering Functional and Approximate Dependencies", The Computer Journal, vol. 42, No. 2 (1999).
Huhtala, Y. et al., "Efficient Discovery of Functional and Approximate Dependencies Using Paritions," Proceedings of the 14th International Conference on Data Engineering, Feb. 23-27, 1998, pp. 392-401.

(56) References Cited

OTHER PUBLICATIONS

Huhtala, Y. et al., "Efficient Discovery of Functional and Approximate Dependencies Using Partitions (Extended Version)," University of Helsinki, Department of Computer Science Series of Publications C, Report C-1997-79, Nov. 1997.
Hemard et al.. "Data Dependency Elicitation in Database Reverse Engineering." Institut d'Informattique, University of Namur, Belgium, (2001), 11-19.
Graefe, Goetz. "Query Evaluation Techniques for Large Databases." ACM Computing Surveys, vol. 25, No. 2, Jun. 1993,98 pages.
Florescu, Daniela et al., "A Performance Evaluation of Alternative Mapping Schemes for Storing XML Data in a Relational Database," May 1999, http://www.caravel.inria.fr/Fmbrepubs_dana.html, 31 pages.
Examiner's Report in Australian Application No. 2009200294, dated Jun. 12, 2012,3 pages.
Examination Report in Canadian Application No. 2,655,731 dated Dec. 3, 2009,3 pages.
Examination Report in Canadian Application No. 2,655,735 dated May 4, 2009,2 pages.
USPTO Non-Final Office Action issued for U.S. Appl. No. 10/941,401, dated Jul. 21, 2009,32 pages.
"Evoke", http://www.evokesotlwareocom, (2003).
Dasu et al. "Mining Database Structure; Or, How to Build a Data Quality Browser." ACM SIGMOD 2002 Conference, Jun. 4, 2002, XP-002333902, 240-251.
Chaudhuri, S., "An Overview of Query Optimization in Relational Systems", XP-000782631 , pp. 34-43 (1998).
Bruno et al.. "Efficient Creation of Statistics over Query Expressions." The Computer Society (2003) 201-212.
Brown et al.. "BHUNT: Automatic Discovery of Fuzzy Algebraic Constraints in Relational Data." 29th VLDB Conference, Sep. 9, 2003, XP-002333907.
Bitton et al.. "A Feasibility and Performance Study of Dependency Inference." Department of Electrical Engineering and Computer Science, University of Illinois at Chicago (1989) 635-641.
Bell et al.. "Discovery of Data Dependencies in Relational Databases." LS-8 Report 14, Dortmund, Apr. 3, 1995 1-18.
Bell et al. "Discovery of Data Dependencies in Relational Databases" Research Reports of the Unit No. VIII (AI), Computer Science Department ofDortmund, DE, Apr. 1995,pp. 1-18.

\* cited by examiner

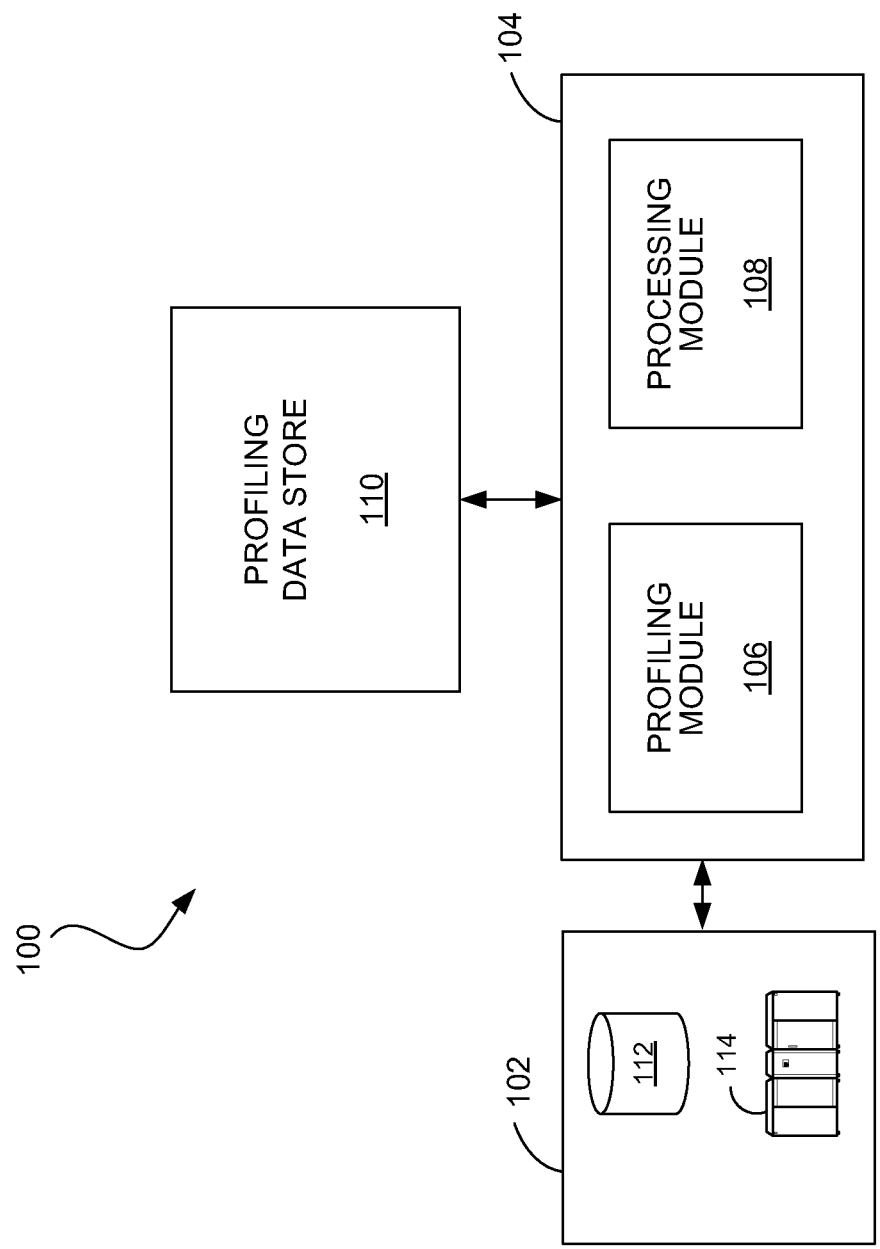

| A-distinct | A-count | B-distinct | B-count | AB-count |
|---|---|---|---|---|
| 1x0 | 1 | - | - | - |
| 0x1 | - | - | 0 | 0 |
| Nx0 | 0 | 0 | - | - |
| 0xN | - | - | 1 | 2 |
| 1x1 | 1 | 1 | 1 | 1 |
| 1xN | 0 | 0 | 0 | 0 |
| Nx1 | 1 | 2 | 1 | 2 |
| NxM | 1 | 2 | 3 | 6 |

PROFILING DATA WITH SOURCE TRACKING

CROSS-REFERENCE TO RELATED APPLICATIONS

This application is a continuation of U.S. application Ser. No. 13/957,641, filed on Aug. 2, 2013, which claims priority to U.S. Application Ser. No. 61/716,766, filed on Oct. 22, 2012, each of which is incorporated herein by reference.

BACKGROUND

This description relates to profiling data with source tracking. Stored data sets often include data for which various characteristics are not known. For example, ranges of values or typical values for a data set, relationships between different fields within the data set, or dependencies among values in different fields, may be unknown. Data profiling can involve examining a source of a data set in order to determine such characteristics.

SUMMARY

In one aspect, in general, a method for profiling data stored in a data storage system includes: accessing multiple collections of records stored in the data storage system over an interface coupled to the data storage system to store quantitative information for each of the multiple collections of records, the quantitative information for each particular collection including, for at least one selected field of the records in the particular collection, a corresponding list of value count entries, with each value count entry including a value appearing in the selected field and a count of the number of records in which the value appears in the selected field; and processing the quantitative information of two or more of the collections to generate profiling summary information. The processing includes: merging the value count entries of corresponding lists for at least one field from each of at least a first collection and a second collection of the two or more collections to generate a combined list of value count entries, and aggregating value count entries of the combined list of value count entries to generate a list of distinct field value entries, at least some of the distinct field value entries identifying a distinct value from at least one of the value count entries and including information quantifying a number of records in which the distinct value appears for each of the two or more collections.

Aspects can include one or more of the following features.

Merging the value count entries of the corresponding lists includes sorting the value count entries based on the values from the value count entries.

Sorting the value count entries includes sorting by a primary sort order based on the values from the value count entries, and sorting by a secondary sort order based on identifiers of the two or more collections.

Processing the quantitative information of two or more of the collections includes processing the quantitative information of three or more of the collections.

The method further includes, for a first subset of at least two of the three or more collections, generating profiling summary information from the list of distinct field value entries, the profiling summary information including multiple patterns of results of a join operation between the fields of respective collections of records in the first subset.

The method further includes, for a second subset of at least two of the three or more collections, different from the first subset, generating profiling summary information from the list of distinct field value entries, the profiling summary information including multiple patterns of results of a join operation between the fields of respective collections of records in the second subset.

Each value count entry in a list of value count entries corresponding to a particular collection further includes location information identifying respective locations within the particular collection of records in which the value appears in the selected field.

The processing includes: reading the value count entries of a corresponding list for at least one field from a third collection of the two or more collections to update the list of distinct field value entries so that at least some of the distinct field value entries identify a distinct value from value count entries of corresponding lists for the first, second, and third collections and include information quantifying a number of records in which the distinct value appears for each of the first, second, and third collections.

In another aspect, in general, a computer program is stored on a computer-readable storage medium, for profiling data stored in a data storage system. The computer program includes instructions for causing a computing system to: access multiple collections of records stored in the data storage system over an interface coupled to the data storage system to store quantitative information for each of the multiple collections of records, the quantitative information for each particular collection including, for at least one selected field of the records in the particular collection, a corresponding list of value count entries, with each value count entry including a value appearing in the selected field and a count of the number of records in which the value appears in the selected field; and process the quantitative information of two or more of the collections to generate profiling summary information. The processing includes: merging the value count entries of corresponding lists for at least one field from each of at least a first collection and a second collection of the two or more collections to generate a combined list of value count entries, and aggregating value count entries of the combined list of value count entries to generate a list of distinct field value entries, at least some of the distinct field value entries identifying a distinct value from at least one of the value count entries and including information quantifying a number of records in which the distinct value appears for each of the two or more collections.

In another aspect, in general, a computing system for profiling data stored in a data storage system includes: an interface coupled to the data storage system configured to access multiple collections of records stored in the data storage system to store quantitative information for each of the multiple collections of records, the quantitative information for each particular collection including, for at least one selected field of the records in the particular collection, a corresponding list of value count entries, with each value count entry including a value appearing in the selected field and a count of the number of records in which the value appears in the selected field; and at least one processor configured to process the quantitative information of two or more of the collections to generate profiling summary information. The processing includes: merging the value count entries of corresponding lists for at least one field from each of at least a first collection and a second collection of the two or more collections to generate a combined list of value count entries, and aggregating value count entries of the combined list of value count entries to generate a list of distinct field value entries, at least some of the distinct field value entries identifying a distinct value from at least one of the value count entries and including information quantifying a number of records in which the distinct value appears for each of the two or more collections.

In another aspect, in general, a computing system for profiling data stored in a data storage system includes: means for accessing multiple collections of records stored in the data storage system to store quantitative information for each of the multiple collections of records, the quantitative information for each particular collection including, for at least one selected field of the records in the particular collection, a corresponding list of value count entries, with each value count entry including a value appearing in the selected field and a count of the number of records in which the value appears in the selected field; and means for processing the quantitative information of two or more of the collections to generate profiling summary information. The processing includes: merging the value count entries of corresponding lists for at least one field from each of at least a first collection and a second collection of the two or more collections to generate a combined list of value count entries, and aggregating value count entries of the combined list of value count entries to generate a list of distinct field value entries, at least some of the distinct field value entries identifying a distinct value from at least one of the value count entries and including information quantifying a number of records in which the distinct value appears for each of the two or more collections.

In another aspect, in general, a method for profiling data stored in a data storage system includes: accessing multiple collections of records stored in the data storage system over an interface coupled to the data storage system to store quantitative information for each of the multiple collections of records, the quantitative information for each particular collection including, for at least one selected field of the records in the particular collection, a corresponding list of value count entries, with each value count entry including a value appearing in the selected field and a count of the number of records in which the value appears in the selected field; and processing the quantitative information of two or more of the collections to generate profiling summary information. The processing includes: reading the value count entries of a corresponding list for at least one field from a first collection of the two or more collections to store output data that includes a list of distinct field value entries, and reading the value count entries of a corresponding list for at least one field from a second collection of the two or more collections to store updated output data based at least in part on the stored output data so that at least some of the distinct field value entries identify a distinct value from value count entries of corresponding lists for the first and second collections and include information quantifying a number of records in which the distinct value appears for each of the first and second collections.

Aspects can include one or more of the following features.

Processing the quantitative information of two or more of the collections includes processing the quantitative information of three or more of the collections.

The method further includes, for a first subset of at least two of the three or more collections, generating profiling summary information from the list of distinct field value entries, the profiling summary information including multiple patterns of results of a join operation between the fields of respective collections of records in the first subset.

The method further includes, for a second subset of at least two of the three or more collections, different from the first subset, generating profiling summary information from the list of distinct field value entries, the profiling summary information including multiple patterns of results of a join operation between the fields of respective collections of records in the second subset.

Each value count entry in a list of value count entries corresponding to a particular collection further includes location information identifying respective locations within the particular collection of records in which the value appears in the selected field.

The processing includes: reading the value count entries of a corresponding list for at least one field from a third collection of the two or more collections to update the list of distinct field value entries so that at least some of the distinct field value entries identify a distinct value from value count entries of corresponding lists for the first, second, and third collections and include information quantifying a number of records in which the distinct value appears for each of the first, second, and third collections.

In another aspect, in general, a computer program is stored on a computer-readable storage medium, for profiling data stored in a data storage system. The computer program includes instructions for causing a computing system to: access multiple collections of records stored in the data storage system over an interface coupled to the data storage system to store quantitative information for each of the multiple collections of records, the quantitative information for each particular collection including, for at least one selected field of the records in the particular collection, a corresponding list of value count entries, with each value count entry including a value appearing in the selected field and a count of the number of records in which the value appears in the selected field; and process the quantitative information of two or more of the collections to generate profiling summary information. The processing includes: reading the value count entries of a corresponding list for at least one field from a first collection of the two or more collections to store output data that includes a list of distinct field value entries, and reading the value count entries of a corresponding list for at least one field from a second collection of the two or more collections to store updated output data based at least in part on the stored output data so that at least some of the distinct field value entries identify a distinct value from value count entries of corresponding lists for the first and second collections and include information quantifying a number of records in which the distinct value appears for each of the first and second collections.

In another aspect, in general, a computing system for profiling data stored in a data storage system includes: an interface coupled to the data storage system configured to access multiple collections of records stored in the data storage system to store quantitative information for each of the multiple collections of records, the quantitative information for each particular collection including, for at least one selected field of the records in the particular collection, a corresponding list of value count entries, with each value count entry including a value appearing in the selected field and a count of the number of records in which the value appears in the selected field; and at least one processor configured to process the quantitative information of two or more of the collections to generate profiling summary information. The processing includes: reading the value count entries of a corresponding list for at least one field from a first collection of the two or more collections to store output data that includes a list of distinct field value entries, and reading the value count entries of a corresponding list for at least one field from a second collection of the two or more collections to store updated output data based at least in part on the stored output data so that at least some of the distinct field value entries identify a distinct value from value count entries of corresponding lists for the first and second collections and include information quantifying a number of records in which the distinct value appears for each of the first and second collections.

In another aspect, in general, a computing system for profiling data stored in a data storage system includes: means for accessing multiple collections of records stored in the data storage system to store quantitative information for each of the multiple collections of records, the quantitative information for each particular collection including, for at least one selected field of the records in the particular collection, a corresponding list of value count entries, with each value count entry including a value appearing in the selected field and a count of the number of records in which the value appears in the selected field; and means for processing the quantitative information of two or more of the collections to generate profiling summary information. The processing includes: reading the value count entries of a corresponding list for at least one field from a first collection of the two or more collections to store output data that includes a list of distinct field value entries, and reading the value count entries of a corresponding list for at least one field from a second collection of the two or more collections to store updated output data based at least in part on the stored output data so that at least some of the distinct field value entries identify a distinct value from value count entries of corresponding lists for the first and second collections and include information quantifying a number of records in which the distinct value appears for each of the first and second collections.

Aspects can include one or more of the following advantages.

One aspect of the design of relational database management systems and other relational data storage systems are the values known as keys, which can be used to identify and/or to link (or "join") records in different entities (e.g., different collections of records such as different tables or datasets). The extent to which the keys successfully enable relational operations (e.g., a join operation) between records intended in the design is known as referential integrity. Maintaining referential integrity over time as records are inserted, updated or deleted is an aspect of maintaining a reliable relational data storage system. To this end, some relational databases offer constraints to enforce relational integrity (e.g., a record with a field value that is a foreign key referencing a primary key of a corresponding record cannot be inserted into one entity unless that corresponding record is already present in another entity). But checking such constraints may reduce performance when loading data, so many of the largest or most active systems may have no constraints or the constraints may have been turned off. So, assessing the referential integrity of a relational system may be a part of assessing the data quality of the system. If referential integrity constraints are not automatically enforced as data is inserted, updated or deleted, violations of the constraints are likely to occur and the referential integrity of the system will erode.

In some systems, typical operations may include a join operation between entities, in which values in a key field of records of one entity are compared with values in a key field of records in another entity. The values in these corresponding key fields are called the "key" for the join operation. The referential integrity of a data storage system storing two entities configured to be joined by a key can be assessed directly by realizing the join on the key explicitly. Analysis of various kinds of joined records that would result from the join operation can be performed when assessing referential integrity. For example, the following record counts may be considered: the number of records joined by a key that is unique in both entities, the number of records joined by a key that is unique in one entity but not the other, the number of records joined by a key that is not unique in either entity, the number of records having a unique key in one entity but not present in the other entity, the number of records having a non-unique key in one entity but not present in the other entity. Collectively these counts answer questions about key uniqueness, Cartesian products (e.g., non-unique keys in both joined entities), and orphaned records (e.g., keys absent from a joined entity). These are examples of some basic measures of referential integrity. The techniques described herein facilitate computation of some of these and other measures of referential integrity of data that is being profiled.

Other features and advantages of the invention will become apparent from the following description, and from the claims.

DESCRIPTION OF DRAWINGS

FIG. 1 is a block diagram of a system for profiling data.

DESCRIPTION

Figures 2A, 2B:
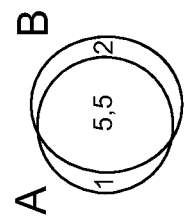
FIG. 2A is chart for an example of occurrence statistics.
FIG. 2B is a Venn diagram for an example of occurrence statistics.

FIG. 1 shows an exemplary data processing system 100 in which the data profiling techniques can be used. The system 100 includes a data source 102 that may include one or more sources of data such as storage devices or connections to online data streams, each of which may store data in any of a variety of storage formats (e.g., database tables, spreadsheet files, flat text files, or a native format used by a mainframe). An execution environment 104 includes a profiling module 106 and processing module 108. The execution environment 104 may be hosted on one or more general-purpose computers under the control of a suitable operating system, such as the UNIX operating system. For example, the execution environment 104 can include a multiple-node parallel computing environment including a configuration of computer systems using multiple central processing units (CPUs), either local (e.g., multiprocessor systems such as SMP computers), or locally distributed (e.g., multiple processors coupled as clusters or MPPs), or remote, or remotely distributed (e.g., multiple processors coupled via a local area network (LAN) and/or wide-area network (WAN)), or any combination thereof.

The profiling module 106 reads data from the data source 102 and stores profiling summary information in a profiling data store 110 that is accessible to the profiling module 106 and to the processing module 108. For example, the profiling data store 110 can be maintained within a storage device of the data source 102, or in a separate data storage system accessible from within the execution environment 104. Based on the profiling summary information, the processing module 108 is able to perform various processing tasks on the data in the data source 102, including cleansing the data, loading the data into another system, or managing access to objects stored in the data source 102. Storage devices providing the data source 102 may be local to the execution environment 104, for example, being stored on a storage medium connected to a computer running the execution environment 104 (e.g., hard drive 112), or may be remote to the execution environment 104, for example, being hosted on a remote system (e.g., mainframe 114) in communication with a computer running the execution environment 104, over a remote connection or service (e.g., provided by a cloud computing infrastructure).

The profiling module 106 is able to read data stored in the data source 102 and perform various kinds of analysis in an efficient manner, including analysis useful for assessing referential integrity of the stored data. As described above, one way to assess referential integrity is by performing an explicit join operation and analyzing resulting joined records. However, performing an explicit join operation between pairs of entities is not always the most efficient way to assess referential integrity, especially in the context of a wider data quality evaluation that may be part of the data profiling performed by the profiling module 106. Some data profiling procedures characterize the quality of a dataset by investigating the collection of distinct values in a set of one or more selected fields (or combinations of fields). To facilitate the data profiling activity, a census computation may be performed to generate census data that enumerates the set of distinct values for each of the selected fields and includes counts of the number of records having each distinct value. For example, the census data can be arranged as a list of value count entries for a selected field, with each value count entry including a distinct value appearing in the selected field and a count of the number of records in which that distinct value appears in the selected field. In some implementations, the census data is stored in a single dataset, optionally indexed by field for fast random access, while in other implementations, the census data may be stored in multiple datasets, for example, one for each field.

In one approach, a referential integrity assessment is provided by a join analysis that summarizes results of a join operation between fields of two entities using occurrence statistics that characterize various quantities associated with different types of joined records and different types of un-joined records. For a join operation between a key field (field A) of a first entity (entity A) and a corresponding key field (field B) of a second entity (entity B), an example of different patterns of occurrences numbers are shown in the chart of FIG. 2A. An "occurrence number" represents the number of times a value occurs in a field. An occurrence number of 0 means the value does not appear in the field. An occurrence number of 1 means the value only appears in exactly one record of the field. An occurrence value of 'M' or 'N' means the value appears in more than one record of the field. In this example, each row of the chart includes counts associated with a corresponding pattern: 'field A occurrence number'×'field B occurrence number'. Each column of the chart includes counts associated with the different patterns that are of a particular type. The type 'A-distinct' ('B-distinct') represents the number of distinct values appearing in a record of entity A (entity B) associated with a particular pattern of occurrence. The type 'A-count' ('B-count') represents the total number of records of entity A (entity B) associated with a particular pattern of occurrence. The type 'AB-count' represents the total number of joined records associated with a particular pattern of occurrence. The bottom half of the chart (i.e., rows having a pattern of occurrence: 1×1, 1×N, N×1, N×M) represents joined records (where a particular key value appears in both fields A and B), and the top half of the chart (i.e., having a pattern of occurrence: 1×0, 0×1, N×0, 0×N) represents un-joined records (where a particular key value only appears in one field A or B). The actual counts appearing in this chart are the counts that would result from an A field having the values: 'a' in 1 record, 'b' in 1 record, 'd' in 2 records, 'e' in 2 records; and a B field having the values: 'a' in 1 record, 'c' in 2 records, 'd' in 1 record, 'e' in 3 records. So, there are a total of 6 records in entity A and 7 records in entity B. FIG. 2B shows a Venn diagram that visually represents another form of occurrence statistic. The diagram shows the numbers of records that do not match in the join operation and are either passed through (in an outer join) or are rejected (in an inner join) as un-joined records in the non-overlapping portions of the circles associated with entity A (1 un-joined record) and entity B (2 un-joined records). The diagram shows the numbers of remaining records for each entity that do match in the join operation in the overlapping portion (5 records in entity A, 5 records in entity B). These 10 matching records yield a total of 9 joined records (which is the sum of the counts in the column 'AB-count'). Relative sizing of the circles and centering of the overlap can be used to indicate qualitatively the counts in each region.

The join analysis can be performed based on performing an actual join operation on the actual records of the entities, or by performing a "census join" operation on respective sets of census data for the entities (e.g., as described in U.S. Pat. No. 7,849,075, incorporated herein by reference). In a census join, each entity has a set of census records, where each record includes: a field identifier (e.g., field A or field B), a distinct value appearing in that field, and a count of the number of records in which that distinct value appears. By comparing census records generated for the key fields of the two entities, the census join operation potentially makes a much smaller number of comparisons than a join operation that compares those key fields of individual records from the two entities. If the census join operation finds a match between the values in two input census records, an output record is generated that contains the matched value, the corresponding pattern of occurrence based on the two counts, and a total number of records that would be generated in a join operation on the pair of key fields (which is just the product of the two counts in the census records). If no match is found for a value, the value is also output with a corresponding pattern of occurrence and a total number of records (which is the single count in the single census record). This information within the output records of the census join operation is sufficient to compile all of the counts in a chart of the above occurrence statistics for the join operation.

In some cases, it is useful to be able to perform join analysis on multiple pairs of entities, for example, for analyzing referential integrity of a data source that includes multiple collections of records (e.g., multiple tables from one or more databases, and/or multiple datasets from one or more file-based data stores). Particular entities may be paired with many other entities in order to determine occurrence statistics for each pair. However, instead of requiring the records in a key field of each entity, or census records in respective census files for each entity, to be read multiple times, the profiling module 106 is able to generate occurrence statistics using fewer time-consuming read operations on the data source. For instance, if there are three datasets A, B and C and the join analysis calls for pairwise occurrence statistics for A/B, A/C, and B/C, separate independent analysis of each pair would call for each census file to be read twice. In general, for N entities to be analyzed independently in all possible combinations, there are $N(N-1)/2$ unique pairs, which would require each entity be read N-1 times (once for each other entity). When the number of entities being analyzed is larger than two (e.g., 3 or more, or significantly larger than two such as 10 or more, or 100 or more), significant efficiency can be achieved by processing the entities together using some of the techniques described herein. For example, in some cases join analysis is performed over many entities (e.g., tables) according to an entity-relationship diagram of a database.

The profiling module 106 is able to avoid repeated read operations of the same census file by using an approach that yields results of multiple pairwise join operations (or a multi-way join) on the key field, without requiring the actual join operations to be performed (either on the entity records or on the census records). The following two examples of such approaches include accessing multiple entities to write a census file for each entity (or read a previously stored census file) for a common key field (e.g., an account number field) occurring in each entity. (There may also be other census files for other fields that are not needed for the join analysis.) An "aggregation" approach also includes merging the census records from corresponding census files for the key field to generate a sorted combined list of census records (or at least the values and counts from the census records, labeled with identifiers to identify the source entity). In some implementations, the census records within each census file are sorted, which makes the merging operation more efficient in terms of storage and read access-time.

In some implementations, merging and sorting of census records from different census files into an intermediate combined list of census records is not required. In an "updating" approach, incoming (potentially unsorted) census records can be processed to update a list of output data entries that have been generated from previously received census data, held in a storage system or data structure and accessible by a key value from an incoming census record. As new census records arrive, output data entries are retrieved from storage using the key value from the incoming census record, updated, and written back to storage. A variety of storage systems are supported, including disk, in-memory data structures, and write-once storage (where previous results cannot be updated in place but must be appended to storage).

In the "updating" approach, the census files need not be processed at the same time but may be incorporated as updates as they become available over time. In particular, a later version of a previously processed census file may be reprocessed to update previous results. It is also possible to combine two or more sets of results computed separately.

In some implementations, a mixture of both updating approach and the aggregation approach may be used. For census files available at the same time, aggregation may be used to reduce memory footprint or to improve performance. For census files arriving at separate times, updating may be used to update previous results. The aggregation approach can be applied independently to sets of census files while the results are combined later using the updating approach.

Figure 3:
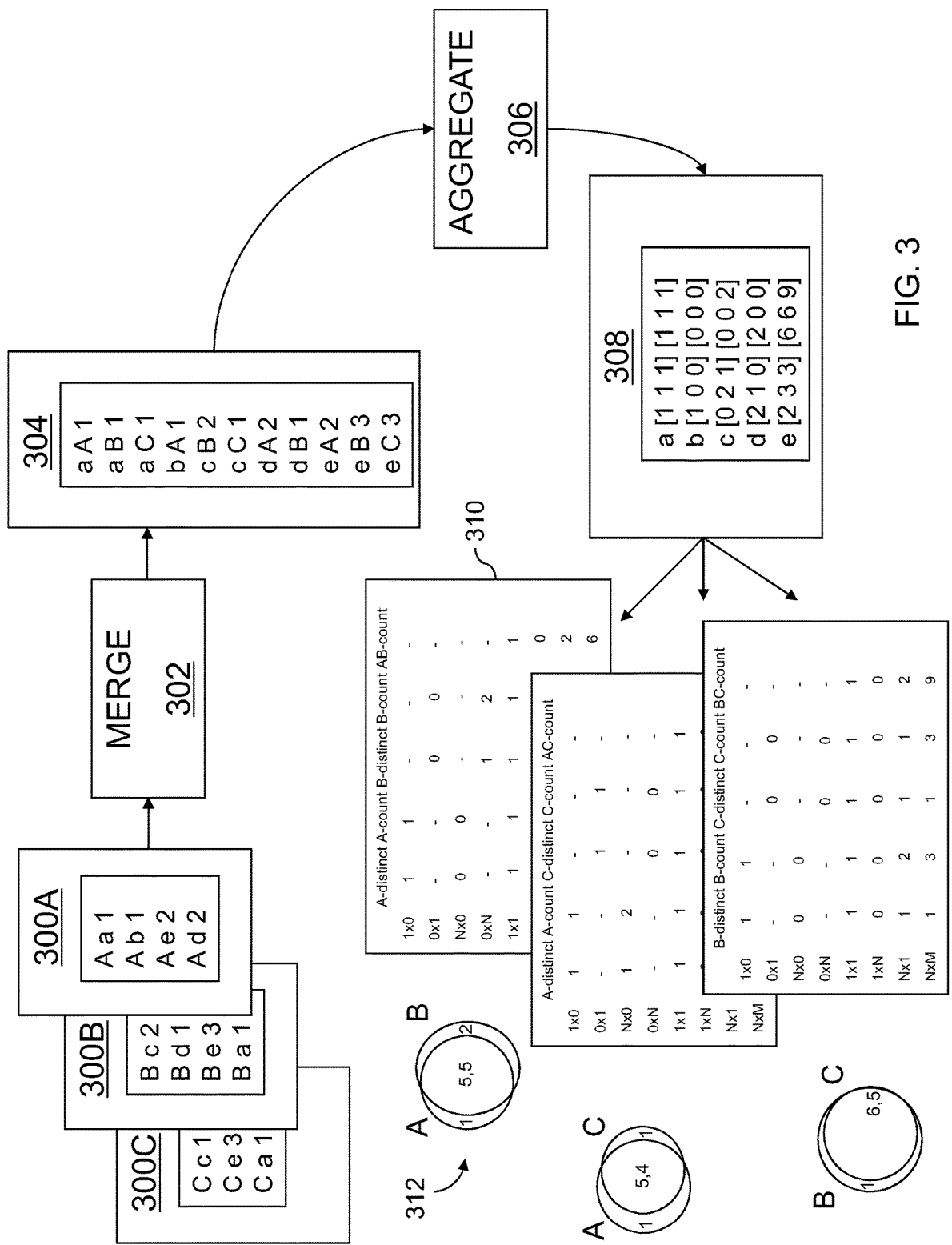
FIGS. 3-6 are schematic diagrams of exemplary data profiling procedures.

An example of the aggregation approach is illustrated in FIG. 3. In this example, three census files 300A, 300B, 300C for respective source entities entity A, entity B, and entity C are used as input to the profiling module 106 (though the approach works for an arbitrary number of census files). Each census file includes census records that start with a source identifier indicating the source entity to which the census file belongs ('A', 'B', or 'C'). After the source identifier, the census records include a distinct key field value appearing in the key field associated with the census file, followed by a count of the number of records that include that key field value. In this example, all of the census records in a census file are for a specific key field of interest within the entity. In other examples, an additional identifier is included in the census record identifying the field associated with each value. Since only accessing the census records of interest to the join analysis is more efficient than reading all census records for all fields of an entity and discarding the irrelevant ones, some implementations store census records for different fields within different independently accessible census files, as in this example. Alternatively, census records for different fields can be stored in different sections of a common file or data store that is configured for random access to the different sections. Multiple join analyses for different key fields can be performed in the same execution by adding another identifier that designates the group of census files to be analyzed together.

A merge sub-module 302 of the profiling module 106 reads the census records from the input census files to generate a sorted combined list 304 of census entries from all of the census records. In some implementations, the input census files are read sequentially (and optionally in parallel if, for example, they are stored in partitioned data segments of a storage medium). For a parallel implementation, the census records can be partitioned by the key field value in each census file, so that all records sharing a common key field value are placed in the same data segment. The census records from the input census files are sorted by a primary sort order based on the key field values from the census records, and then by a secondary sort order based on the source identifiers. In the list 304 shown in FIG. 3, the census entries have been rewritten to show the primary sorted key field values first, followed by the secondary sorted source identifiers, followed by the record count, but these items can be stored in any order within each census entry. If multiple join analyses on different respective groups of census files are to be conducted concurrently, a label designating the group of census files to be analyzed together can be added as the primary sort-key (with a secondary sort on the key field value, and a tertiary sort on the source identifier) to ensure that records intended to be analyzed together are contiguous.

An aggregate sub-module 306 of the profiling module 106 aggregates the entries from the list 304 to generate a list 308 of distinct key field value entries, each distinct key field value entry identifying a distinct key field value and information quantifying a number of records in which the distinct key field value appears for each of the source entities represented by the input census files (in this example, source entities A, B, and C). The sorted census entries in the list 304 that share the same key field value are aggregated (e.g., using a rollup operation) over the source identifiers. In some implementations, the aggregate sub-module 306 stores results of aggregating the entries in a data structure containing two vectors associated with each distinct key field value. One vector stores the individual entity record counts for each source entity, and the other vector stores the pair-wise join record counts for each pair of source entities. So, the length of the first vector is determined by the number of source entities, and the length of the second vector is determined by the number of unique pairs of source entities. Each element of the first vector corresponds to a particular source entity and holds the count of records containing the associated key field value, which is the count from the census file if the count is nonzero or a count of zero if that key field value did not appear in the census file. This data structure is also able to accommodate changing numbers of files in separate groups of census files in multiple analyses. For example, the sub-module 306 is able to use a mechanism, such as a stored variable or a lookup operation, to associate an index in the vector to a particular census file for each group. Each entry of the second vector holds a count of the number of join records that would result from a join operation between a particular pair of source entities, which is computed as the product of the counts for each pair (which are in the first vector). The index structure of the second vector can be determined based on the order of entities in the first vector (e.g., by forming a multi-index consisting of all pairs of indices where the first index is less than the second).

In the example of FIG. 3, there are two census records with the key field value "c": one each in the entity B and entity C census files 300B and 300C. The count of entity records in the entity B census record is 2, and the count of entity records in the entity C census record is 1. The corresponding aggregated output data structure in the list 308 is "c [0 2 1] [0 0 2]" where the first item in the data structure is the key field value "c", the next item is the first vector of record counts in entities A, B, and C, respectively, and the last item is the second vector of the product of counts for entity pairs A/B, A/C, and B/C, respectively. This second vector can be omitted in some implementations, and can instead be generated later since its values are completely determined by the values in the first vector.

From the information in the list 308, summary information, such as the chart in FIG. 2A and the Venn diagram in FIG. 2B, can be computed for each pair of source entities by accessing the appropriate values from the data structures in the list 308 for the occurrence statistics to be provided. (Similar summary information for three-way and higher order joins are also possible.) The counts for pairings of unique and non-unique records can be reported separately as non-uniqueness is often of particular interest. As described above, a Venn diagram for each pair can be generated to visually represent the results of the join analysis. For example, for the pair A/B, the relative sizes of the circles and the centering of the circles 312 and the resulting overlap can be arranged to indicate quantitatively the approximate values of the counts in each region determined based on the information in the corresponding occurrence chart 310.

In some implementations, the data structures for the census records in the census files 300A, 300B, 300C can also include location information identifying respective locations of records within the particular entities in which the key field values appear. In one implementation, during generation of the census records, a vector is populated with unique record identifiers of every record having the associated key field value. If the records in the original data of the entities do not have unique record identifiers, such record identifiers can be generated and added to the records as part of the profiling procedures, for example, by assigning a sequence of consecutive numbers to each record. This location information can then be included within the census entries collected from the census records in the merging stage, and can be combined in the aggregation stage, as described in more detail below.

Other implementations for storing location information are possible, some of which may offer advantages in performance and/or reduced storage space. For example, a bit vector may be used instead of a vector of record identifiers. Each bit of the bit vector corresponds to a particular record identifier, and a bit is set if the associated record having the corresponding record identifier has the associated key field value. The correspondence between bits of the bit vector and record identifier may be explicit or implicit. For example, there may be an explicit mapping, not necessarily one-to-one, which associates bits to corresponding record identifiers, or there may be an implicit mapping where the position of each bit corresponds to a sequential ordering of record locations. In some implementations, the resulting bit vector is compressed for further savings in storage.

By associating a location data structure with each census entry, this location information may be propagated through to the list 308 where it appears as a vector of location data structures for each aggregated output data structure. The vector of location data structures includes one location data structure (e.g., a bit vector) for each source entity. The presence of the vector of location data structures in each aggregated output data structure of the list 308 facilitates "drill down" from results to corresponding records in the original source entities. In some cases, the key field value itself can be used to lookup records in the original source entity, if the source entity has been indexed by the key field values, which may not be the case for some source entities. The location data structure is able to serve as a generic index of the original source entity, and the census file associated with that source entity is able to serve as a secondary index (linking key values to the index within the location data structure).

The generation of the pairwise occurrence charts 310 and associated Venn diagrams 312 involves an aggregation over the output data structures in the list 308. For example, counts in output data structures corresponding to each occurrence category (e.g., 1×0, 1×1, etc.) are summed to produce the resultant total counts. The location data structures can also be combined. In the case of a location data structure that is a vector of record identifiers, the vectors corresponding to different key field values in a particular source entity for a particular occurrence category are concatenated. In the case of location data structure that is a bit vector, the bit vectors corresponding to different key field values in a particular source entity for a particular occurrence category are logically ORed together. The result is a combined location data structure corresponding to each entry in the occurrence chart or entry in the Venn diagram. A user may drill down from this entry using this location data structure to retrieve either a sample record or the exhaustive set of records for this occurrence category. In the referential integrity assessment context, being able to access the records that are duplicates or orphaned, for example, is invaluable, and this provides the capability to do so.

A different implementation is possible in which the aggregation to the occurrence chart and Venn diagrams does not combine the location data structures themselves but instead constructs a bit vector corresponding to the key field values in the list 308. In this implementation, a bit-to-key-value mapping is constructed that pairs a bit index with each distinct key field value in the list 308. During aggregation, a bit vector is populated that indicates which key field values contribute to a given occurrence chart entry. Drill down may now proceed in two steps. The bit vector for an occurrence chart entry is used to find the set of associated key field values (from the bit-to-key-value mapping). These key field values are either looked up directly in the original source entities to retrieve original records, or they are looked up to retrieve location data structures in, e.g., the list 308 or the census files 300A-300C (which are in turn used to retrieve the original records). This implementation may offer advantages in terms of storage requirements and efficiency, particularly if the original source entities are already indexed by the key field values.

Figure 4:
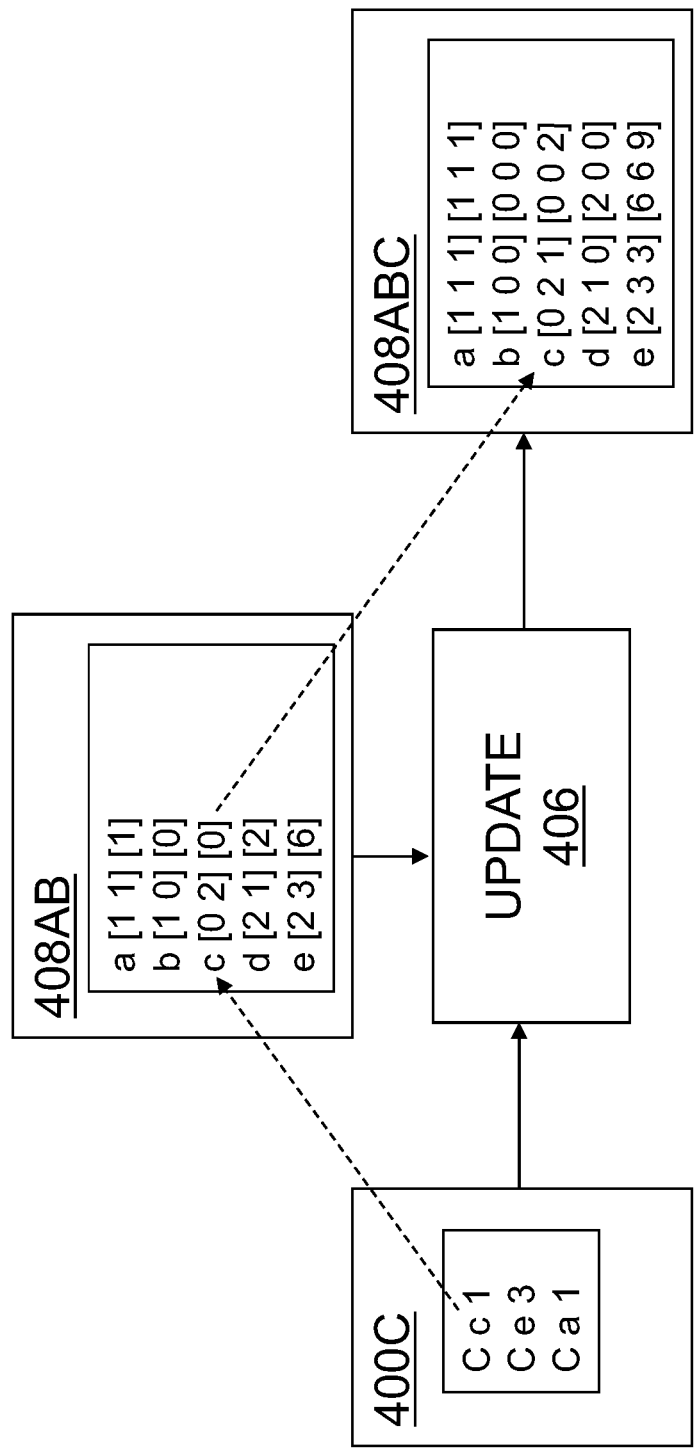

FIG. 4 shows an updating approach in which a census file 400C (for entity C) arrives to an update sub-module 406 of the profiling module 106, which updates a previously generated output list 408AB (previously generated from census files of entities A and B) to produce an updated list 408ABC. A census entry "C c 1" in census file 400C represents the distinct key field value "c" and a count of 1 record of entity C in which that value appears. The corresponding output data structure in 408AB having key field value "c" is retrieved. The first vector "[0 2]" showing the counts in entity A and entity B of records having the key field value "c" is updated to "[0 2 1]" to add an element showing the count of records in entity C having the key field value "c". Similarly, the second vector showing the pairwise product of counts is updated from "[0]" to "[0 0 2]" where the second element is the product of the count for entity A and the count for entity C (0*2=0), while the third element is the product of the count for entity B and the count for entity C (1*2=2). The result is written to the list 408ABC of updated output data structures.

Figure 5:
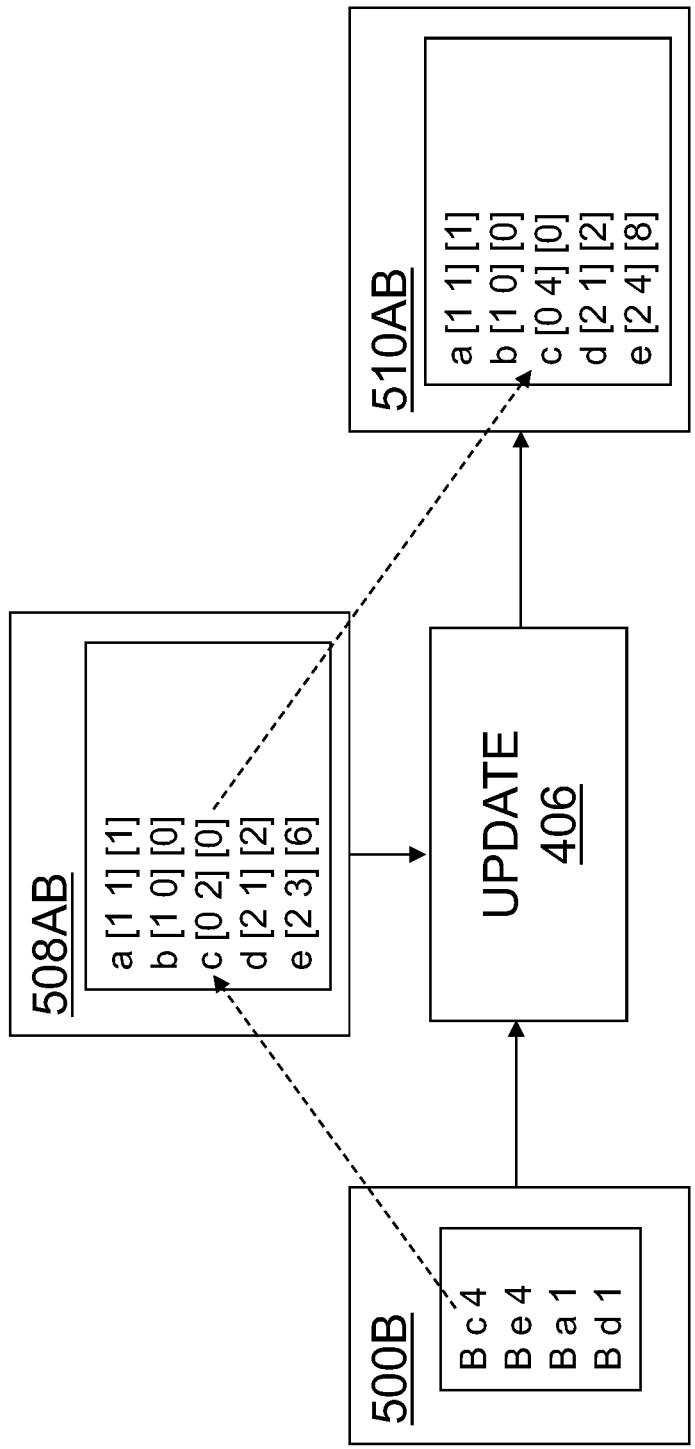

FIG. 5 shows an updating approach in which a census file 500B (for entity B) arrives to the update sub-module 406, which updates a previously generated output list 508AB (previously generated from a census file of entity A and a previous version of a census file of entity B). A census entry "B c 4" in census file 500B represents the distinct key field value "c" and a count of 4 records of entity B in which that value appears. From the corresponding output data structure of the list 508AB, the previous count for "c" in entity B was 2 (according to the second element in the first vector "[0 2]"). This count is updated in the first vector with the new count to obtain "[0 4]". The second vector is then updated with the product of the counts from entity A and entity B, which in this example remains unchanged at "[0]." The result is written to an updated output list 510AB.

Figure 6:
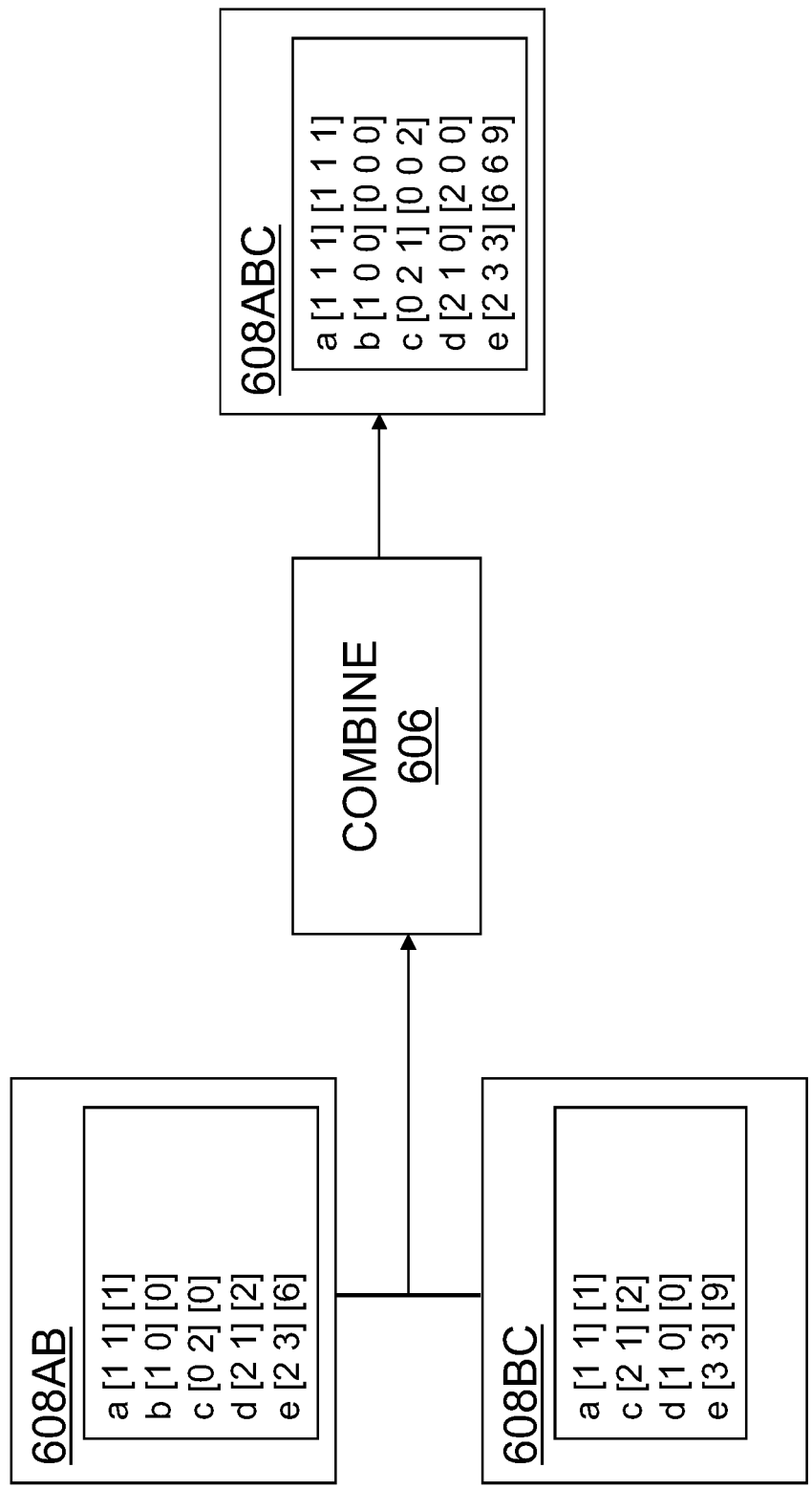

FIG. 6 shows another example of an updating approach in which two separately generated output lists are combined. An output list 608AB was generated based on a combination of census records from entity A and entity B, and an output list 608BC was generated based on a combination of census records for entity B and entity C. In this example, the same census records for entity B were used in the generation of both output lists. (In other examples in which different versions of a census file provide different census records for entity B, the procedure shown in FIG. 5 can first be used to update the entity B values in the output data structures to correspond to the most recent census values.) A combine sub-module 606 of the profiling module 106 combines information from output data structures with matching key field values, for example, output data structure "c [0 2] [0]" from list 608AB and output data structure "c [2 1] [2]" from list 608BC. The elements in each of the first vectors correspond to the census counts of respective entities represented in each output data structure. The two first vectors are combined by taking the union of their elements, keeping only one element (the most recent) for any entity represented in both output data structures. In this example, the result of the combination is an updated first vector "[0 2 1]". An updated second vector is then computed from the pairwise product of counts according to the updated first vector, which results in an updated second vector "[0 0 2]". The updated output data structures are stored in an output list 608ABC.

The data profiling approach described above can be implemented using a computing system executing suitable software. For example, the software may include procedures in one or more computer programs that execute on one or more programmed or programmable computing system (which may be of various architectures such as distributed, client/server, or grid) each including at least one processor, at least one data storage system (including volatile and/or non-volatile memory and/or storage elements), at least one user interface (for receiving input using at least one input device or port, and for providing output using at least one output device or port). The software may include one or more modules of a larger program, for example, that provides services related to the design, configuration, and execution of dataflow graphs. The modules of the program (e.g., elements of a dataflow graph) can be implemented as data structures or other organized data conforming to a data model stored in a data repository.

The software may be provided on a tangible, non-transitory medium, such as a CD-ROM or other computer-readable medium (e.g., readable by a general or special purpose computing system or device), or delivered (e.g., encoded in a propagated signal) over a communication medium of a network to a tangible, non-transitory medium of a computing system where it is executed. Some or all of the processing may be performed on a special purpose computer, or using special-purpose hardware, such as coprocessors or field-programmable gate arrays (FPGAs) or dedicated, application-specific integrated circuits (ASICs). The processing may be implemented in a distributed manner in which different parts of the computation specified by the software are performed by different computing elements. Each such computer program is preferably stored on or downloaded to a computer-readable storage medium (e.g., solid state memory or media, or magnetic or optical media) of a storage device accessible by a general or special purpose programmable computer, for configuring and operating the computer when the storage device medium is read by the computer to perform the processing described herein. The inventive system may also be considered to be implemented as a tangible, non-transitory medium, configured with a computer program, where the medium so configured causes a computer to operate in a specific and predefined manner to perform one or more of the processing steps described herein.

A number of embodiments of the invention have been described. Nevertheless, it is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

What is claimed is:

1. A method for profiling data stored in a data storage system, the method including:
   accessing multiple collections of records stored in the data storage system over an interface coupled to the data storage system;
   determining quantitative information for each of the multiple collections of records, the quantitative information for each particular collection including, for at least one selected field of the records in the particular collection, a corresponding list of value count entries, with each value count entry including a value appearing in at least the selected field and a count of the number of records in which the value appears in at least the selected field; and processing the quantitative information of two or more of the collections to generate profiling summary information, the processing including:
  merging the value count entries of corresponding lists for at least one field from each of at least a first collection and a second collection of the two or more collections to generate a combined list of value count entries, and
  aggregating value count entries of the combined list of value count entries to generate a list of distinct field value entries, at least some of the distinct field value entries identifying a distinct value from at least one of the value count entries;
  wherein each value count entry in a list of value count entries corresponding to a particular collection further includes location information identifying respective locations of records within the particular collection of records in which the value appears in at least the selected field.

2. The method of claim 1, wherein merging the value count entries of the corresponding lists includes sorting the value count entries based on the values from the value count entries.

3. The method of claim 2, wherein sorting the value count entries includes sorting by a primary sort order based on the values from the value count entries, and sorting by a secondary sort order based on identifiers of the two or more collections.

4. The method of claim 1, wherein processing the quantitative information of two or more of the collections includes processing the quantitative information of three or more of the collections.

5. The method of claim 4, wherein the processing includes, for a first subset of at least two of the three or more collections, generating profiling summary information from the list of distinct field value entries, the profiling summary information including multiple patterns of results of a join operation between the fields of respective collections of records in the first subset.

6. The method of claim 5, wherein the processing includes, for a second subset of at least two of the three or more collections, different from the first subset, generating profiling summary information from the list of distinct field value entries, the profiling summary information including multiple patterns of results of a join operation between the fields of respective collections of records in the second subset.

7. The method of claim 1, wherein the processing includes: reading the value count entries of a corresponding list for at least one field from a third collection of the two or more collections to update the list of distinct field value entries so that at least some of the distinct field value entries identify a distinct value from value count entries of corresponding lists for the first, second, and third collections and include information quantifying a number of records in which the distinct value appears for each of the first, second, and third collections.

8. A computer program, stored on a computer-readable storage medium, for profiling data stored in a data storage system, the computer program including instructions for causing a computing system to:
  access multiple collections of records stored in the data storage system over an interface coupled to the data storage system;
  determining quantitative information for each of the multiple collections of records, the quantitative information for each particular collection including, for at least one selected field of the records in the particular collection, a corresponding list of value count entries, with each value count entry including a value appearing in at least the selected field and a count of the number of records in which the value appears in at least the selected field; and
  process the quantitative information of two or more of the collections to generate profiling summary information, the processing including:
    merging the value count entries of corresponding lists for at least one field from each of at least a first collection and a second collection of the two or more collections to generate a combined list of value count entries, and
    aggregating value count entries of the combined list of value count entries to generate a list of distinct field value entries, at least some of the distinct field value entries identifying a distinct value from at least one of the value count entries;
  wherein each value count entry in a list of value count entries corresponding to a particular collection further includes location information identifying respective locations of records within the particular collection of records in which the value appears in at least the selected field.

9. The computer program of claim 8, wherein merging the value count entries of the corresponding lists includes sorting the value count entries based on the values from the value count entries.

10. The computer program of claim 9, wherein sorting the value count entries includes sorting by a primary sort order based on the values from the value count entries, and sorting by a secondary sort order based on identifiers of the two or more collections.

11. The computer program of claim 8, wherein processing the quantitative information of two or more of the collections includes processing the quantitative information of three or more of the collections.

12. The computer program of claim 11, wherein the processing includes, for a first subset of at least two of the three or more collections, generating profiling summary information from the list of distinct field value entries, the profiling summary information including multiple patterns of results of a join operation between the fields of respective collections of records in the first subset.

13. The computer program of claim 12, wherein the processing includes, for a second subset of at least two of the three or more collections, different from the first subset, generating profiling summary information from the list of distinct field value entries, the profiling summary information including multiple patterns of results of a join operation between the fields of respective collections of records in the second subset.

14. The computer program of claim 8, wherein the processing includes: reading the value count entries of a corresponding list for at least one field from a third collection of the two or more collections to update the list of distinct field value entries so that at least some of the distinct field value entries identify a distinct value from value count entries of corresponding lists for the first, second, and third collections and include information quantifying a number of records in which the distinct value appears for each of the first, second, and third collections.

15. A computing system for profiling data stored in a data storage system, the computing system including:

an interface coupled to the data storage system configured to access multiple collections of records stored in the data storage system;

determining quantitative information for each of the multiple collections of records, the quantitative information for each particular collection including, for at least one selected field of the records in the particular collection, a corresponding list of value count entries, with each value count entry including a value appearing in at least the selected field and a count of the number of records in which the value appears in at least the selected field; and at least one processor configured to process the quantitative information of two or more of the collections to generate profiling summary information, the processing including:

merging the value count entries of corresponding lists for at least one field from each of at least a first collection and a second collection of the two or more collections to generate a combined list of value count entries, and aggregating value count entries of the combined list of value count entries to generate a list of distinct field value entries, at least some of the distinct field value entries identifying a distinct value from at least one of the value count entries;

wherein each value count entry in a list of value count entries corresponding to a particular collection further includes location information identifying respective locations of records within the particular collection of records in which the value appears in at least the selected field.

16. The computing system of claim 15, wherein merging the value count entries of the corresponding lists includes sorting the value count entries based on the values from the value count entries.

17. The computing system of claim 16, wherein sorting the value count entries includes sorting by a primary sort order based on the values from the value count entries, and sorting by a secondary sort order based on identifiers of the two or more collections.

18. The computing system of claim 15, wherein processing the quantitative information of two or more of the collections includes processing the quantitative information of three or more of the collections.

19. The computing system of claim 18, wherein the processing includes, for a first subset of at least two of the three or more collections, generating profiling summary information from the list of distinct field value entries, the profiling summary information including multiple patterns of results of a join operation between the fields of respective collections of records in the first subset.

20. The computing system of claim 19, wherein the processing includes, for a second subset of at least two of the three or more collections, different from the first subset, generating profiling summary information from the list of distinct field value entries, the profiling summary information including multiple patterns of results of a join operation between the fields of respective collections of records in the second subset.

21. The computing system of claim 15, wherein the processing includes: reading the value count entries of a corresponding list for at least one field from a third collection of the two or more collections to update the list of distinct field value entries so that at least some of the distinct field value entries identify a distinct value from value count entries of corresponding lists for the first, second, and third collections and include information quantifying a number of records in which the distinct value appears for each of the first, second, and third collections.

22. A computing system for profiling data stored in a data storage system, the computing system including:

means for accessing multiple collections of records stored in the data storage system;

means for determining quantitative information for each of the multiple collections of records, the quantitative information for each particular collection including, for at least one selected field of the records in the particular collection, a corresponding list of value count entries, with each value count entry including a value appearing in at least the selected field and a count of the number of records in which the value appears in at least the selected field; and means for processing the quantitative information of two or more of the collections to generate profiling summary information, the processing including:

merging the value count entries of corresponding lists for at least one field from each of at least a first collection and a second collection of the two or more collections to generate a combined list of value count entries, and aggregating value count entries of the combined list of value count entries to generate a list of distinct field value entries, at least some of the distinct field value entries identifying a distinct value from at least one of the value count entries;

wherein each value count entry in a list of value count entries corresponding to a particular collection further includes location information identifying respective locations of records within the particular collection of records in which the value appears in at least the selected field.

23. A method for profiling data stored in a data storage system, the method including:

accessing multiple collections of records stored in the data storage system over an interface coupled to the data storage system;
and processing quantitative information of two or more of the collections to generate profiling summary information, the processing including:

determining the quantitative information for each of the multiple collections of records, the quantitative information for each particular collection including, for at least one selected field of the records in the particular collection, a corresponding list of value count entries, with each value count entry including a value appearing in at least the selected field and a count of the number of records in which the value appears in at least the selected field, reading the value count entries of a corresponding list for at least one field from a first collection of the two or more collections to store output data that includes a list of distinct field value entries, and reading the value count entries of a corresponding list for at least one field from a second collection of the two or more collections to store updated output data based at least in part on the stored output data so that at least some of the distinct field value entries identify a distinct value from value count entries of corresponding lists for the first and second collections;

wherein each value count entry in a list of value count entries corresponding to a particular collection further includes location information identifying respective locations of records within the particular collection of records in which the value appears in at least the selected field.

24. The method of claim 23, wherein processing the quantitative information of two or more of the collections includes processing the quantitative information of three or more of the collections.

25. The method of claim 24, further including, for a first subset of at least two of the three or more collections, generating profiling summary information from the list of distinct field value entries, the profiling summary information including multiple patterns of results of a join operation between the fields of respective collections of records in the first subset.

26. The method of claim 25, further including, for a second subset of at least two of the three or more collections, different from the first subset, generating profiling summary information from the list of distinct field value entries, the profiling summary information including multiple patterns of results of a join operation between the fields of respective collections of records in the second subset.

27. The method of claim 23, wherein the processing includes: reading the value count entries of a corresponding list for at least one field from a third collection of the two or more collections to update the list of distinct field value entries so that at least some of the distinct field value entries identify a distinct value from value count entries of corresponding lists for the first, second, and third collections and include information quantifying a number of records in which the distinct value appears for each of the first, second, and third collections.

28. A computer program, stored on a computer-readable storage medium, for profiling data stored in a data storage system, the computer program including instructions for causing a computing system to:
   access multiple collections of records stored in the data storage system over an interface coupled to the data storage system;
   determine quantitative information for each of the multiple collections of records, the quantitative information for each particular collection including, for at least one selected field of the records in the particular collection, a corresponding list of value count entries, with each value count entry including a value appearing in at least the selected field and a count of the number of records in which the value appears in at least the selected field; and
   process the quantitative information of two or more of the collections to generate profiling summary information, the processing including:
      reading the value count entries of a corresponding list for at least one field from a first collection of the two or more collections to store output data that includes a list of distinct field value entries, and
      reading the value count entries of a corresponding list for at least one field from a second collection of the two or more collections to store updated output data based at least in part on the stored output data so that at least some of the distinct field value entries identify a distinct value from value count entries of corresponding lists for the first and second collections;
   wherein each value count entry in a list of value count entries corresponding to a particular collection further includes location information identifying respective locations of records within the particular collection of records in which the value appears in at least the selected field.

29. The computer program of claim 28, wherein processing the quantitative information of two or more of the collections includes processing the quantitative information of three or more of the collections.

30. The computer program of claim 29, wherein the processing includes, for a first subset of at least two of the three or more collections, generating profiling summary information from the list of distinct field value entries, the profiling summary information including multiple patterns of results of a join operation between the fields of respective collections of records in the first subset.

31. The computer program of claim 30, wherein the processing includes, for a second subset of at least two of the three or more collections, different from the first subset, generating profiling summary information from the list of distinct field value entries, the profiling summary information including multiple patterns of results of a join operation between the fields of respective collections of records in the second subset.

32. The computer program of claim 28, wherein the processing includes: reading the value count entries of a corresponding list for at least one field from a third collection of the two or more collections to update the list of distinct field value entries so that at least some of the distinct field value entries identify a distinct value from value count entries of corresponding lists for the first, second, and third collections and include information quantifying a number of records in which the distinct value appears for each of the first, second, and third collections.

33. A computing system for profiling data stored in a data storage system, the computing system including:
   an interface coupled to the data storage system configured to access multiple collections of records stored in the data storage system; and
   at least one processor configured to process quantitative information of two or more of the collections to generate profiling summary information, the processing including:
      determining the quantitative information for each of the multiple collections of records, the quantitative information for each particular collection including, for at least one selected field of the records in the particular collection, a corresponding list of value count entries, with each value count entry including a value appearing in at least the selected field and a count of the number of records in which the value appears in at least the selected field,
      reading the value count entries of a corresponding list for at least one field from a first collection of the two or more collections to store output data that includes a list of distinct field value entries, and
      reading the value count entries of a corresponding list for at least one field from a second collection of the two or more collections to store updated output data based at least in part on the stored output data so that at least some of the distinct field value entries identify a distinct value from value count entries of corresponding lists for the first and second collections;
   wherein each value count entry in a list of value count entries corresponding to a particular collection further includes location information identifying respective locations of records within the particular collection of records in which the value appears in at least the selected field.

34. The computing system of claim 33, wherein processing the quantitative information of two or more of the collections includes processing the quantitative information of three or more of the collections.

35. The computing system of claim 34, wherein the processing includes, for a first subset of at least two of the three or more collections, generating profiling summary information from the list of distinct field value entries, the profiling summary information including multiple patterns of results of a join operation between the fields of respective collections of records in the first subset.

36. The computing system of claim 35, wherein the processing includes, for a second subset of at least two of the three or more collections, different from the first subset, generating profiling summary information from the list of distinct field value entries, the profiling summary information including multiple patterns of results of a join operation between the fields of respective collections of records in the second subset.

37. The computing system of claim 33, wherein the processing includes: reading the value count entries of a corresponding list for at least one field from a third collection of the two or more collections to update the list of distinct field value entries so that at least some of the distinct field value entries identify a distinct value from value count entries of corresponding lists for the first, second, and third collections and include information quantifying a number of records in which the distinct value appears for each of the first, second, and third collections.

38. A computing system for profiling data stored in a data storage system, the computing system including:

means for accessing multiple collections of records stored in the data storage system;

means for determining quantitative information for each of the multiple collections of records, the quantitative information for each particular collection including, for at least one selected field of the records in the particular collection, a corresponding list of value count entries, with each value count entry including a value appearing in at least the selected field and a count of the number of records in which the value appears in at least the selected field; and means for processing the quantitative information of two or more of the collections to generate profiling summary information, the processing including:

reading the value count entries of a corresponding list for at least one field from a first collection of the two or more collections to store output data that includes a list of distinct field value entries, and reading the value count entries of a corresponding list for at least one field from a second collection of the two or more collections to store updated output data based at least in part on the stored output data so that at least some of the distinct field value entries identify a distinct value from value count entries of corresponding lists for the first and second collections;

wherein each value count entry in a list of value count entries corresponding to a particular collection further includes location information identifying respective locations of records within the particular collection of records in which the value appears in at least the selected field.

* * * * *